United States Patent [19]

Markos

[11] Patent Number: 4,597,186

[45] Date of Patent: Jul. 1, 1986

[54] LIGHTED PLUMB BOB

[76] Inventor: Peter Markos, 5440 N. Braeswood, #1002, Houston, Tex. 77096

[21] Appl. No.: 764,609

[22] Filed: Aug. 12, 1985

[51] Int. Cl.$^4$ ............................................. G01C 15/10
[52] U.S. Cl. ........................................ 33/392; 33/348
[58] Field of Search ............... 33/348, 392, 393, 394, 33/227; 200/51.07, 329, 334, 336

[56] References Cited

U.S. PATENT DOCUMENTS

| | | | |
|---|---|---|---|
| 880,387 | 2/1908 | Morrill | 33/392 |
| 1,026,669 | 5/1912 | Garner | 33/393 |
| 2,583,491 | 1/1952 | Orlando | 33/393 |
| 2,665,498 | 1/1954 | Mitchell | 33/348 |

FOREIGN PATENT DOCUMENTS

| | | | |
|---|---|---|---|
| 547411 | 12/1922 | France | 33/348 |
| 12345 | of 1903 | United Kingdom | 33/392 |
| 257048 | 12/1968 | U.S.S.R. | 33/392 |

Primary Examiner—Charles Frankfort
Assistant Examiner—Patrick R. Scanlon
Attorney, Agent, or Firm—Dennison, Meserole, Pollack & Scheiner

[57] ABSTRACT

A plumb bob having a built-in light source and electrical power supply including a main barrel, a conical tip and a screw cap. Tightening of the screw cap closes the circuit for operation of the light source. A suspension line extends from the cap and is stored when not in use between the cap and barrel where it serves to prevent tightening of the cap and light source actuation.

5 Claims, 3 Drawing Figures

LIGHTED PLUMB BOB

BACKGROUND OF THE INVENTION

The present invention relates generally to devices for plumbing structural members and assemblies such as walls, beams, columns, door jambs, partitions and the like. Carpenters have always used plumbing devices, such as the conventional suspended pointed plumb bob, for establishing the position on a surface of a point which is unknown relative to a known point.

The conventional plumb bob usually includes a length of string from which a conical heavy bob weight is suspended so that the pointed tip is proximate to the floor or surface. Location of the proper spot is generally inaccurate since the bob weight will normally be from ⅜" to one inch above the surface and an estimate as to where it would touch the surface has to be made. With conventional bobs inaccuracies of from 1/16" to 3/16" are not uncommon.

Attempts have been made to utilize laser technology for precise accurate plumbing, however while such devices are highly accurate, they are large, complex and expensive. Various other attempts at optical plumbing devices have had limited success for specialized purposes. Note the following examples:

Abrams: U.S. Pat. No. 3,505,739
Lagasse: U.S. Pat. No. 3,909,952
Ohneda: U.S. Pat. No. 3,911,588
Benson: U.S. Pat. No. 3,988,837
Boyett et al: U.S. Pat. No. 4,106,207
Boyett et al: U.S. Pat. No. 4,206,550

All of these devices comprise sophisticated structure, not directly interchangeable by the general carpenter for the existing conical plumb bobs.

OBJECTS OF THE INVENTION

The present invention has for a principal object the provision of an improved and relatively inexpensive plumb bob utilizing a built-in light source to project a pin-point spot on the surface where it can be used by carpenters, millwrights, drywall installers, electricians, plumbers and other tradesmen.

Another object of the invention is to provide a lighted plumb bob which may be directly substituted for the conventional weighted plumb bob.

A further object of my invention is to provide a string-supported lighted plumb bob which may also be used as an emergency flashlight.

Another object of the invention is to provide a lighted plumb bob which has storage means for its support line and which cannot be activated when line is stored therein.

Yet a further object of the invention is the provision of a highly accurate inexpensive lighted plumb bob which is easy to use, may be operated either indoors or out, and which may be stored in a space not much larger than a conventional plumb bob.

Further objects and advantages of the invention will be apparent from a consideration of the following specification and drawings.

DETAILED DESCRIPTION

Figure 1:
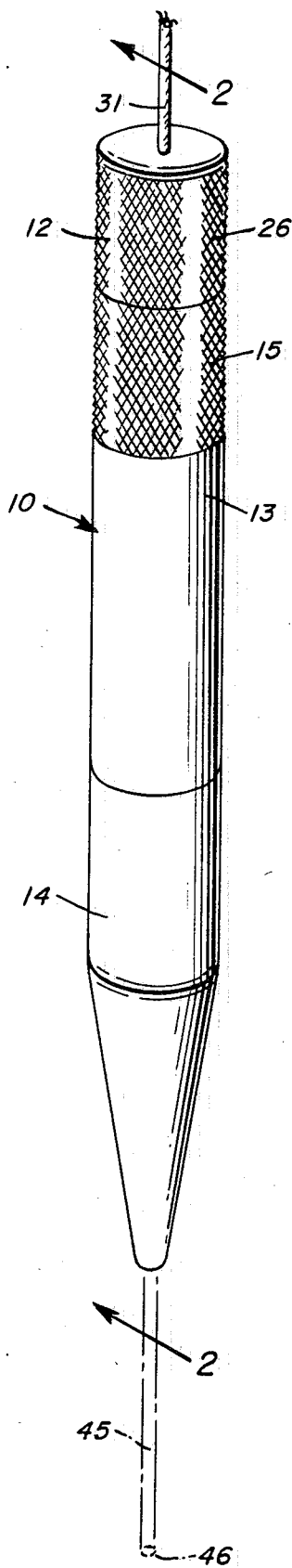
FIG. 1 is a top front perspective view of my new lighted plumb bob.

The lighted plumb bob of my invention is shown generally at 10 and includes three major components; a barrel assembly 13, a cap 12 and a conical tip 14. The three assemblies are preferably fabricated from metal such as aluminum or stainless steel.

Barrel assmebly 13 is hollow throughout and open at both ends. The tubular outer surface near the top of the barrel assembly is knurled as at 15. A reduced diameter neck portion 16 defines the upper end of the barrel assembly and a threaded portion 17 immediately thereabove and of slightly greater diameter serves several functions as later described herein. At the lower end of barrel assembly 13, an internally threaded socket 18 is adapted to receive a conventional flashlight bulb 19. A reduced diameter externally threaded portion 20 serves for connection of the conical tip 14.

Figure 3:
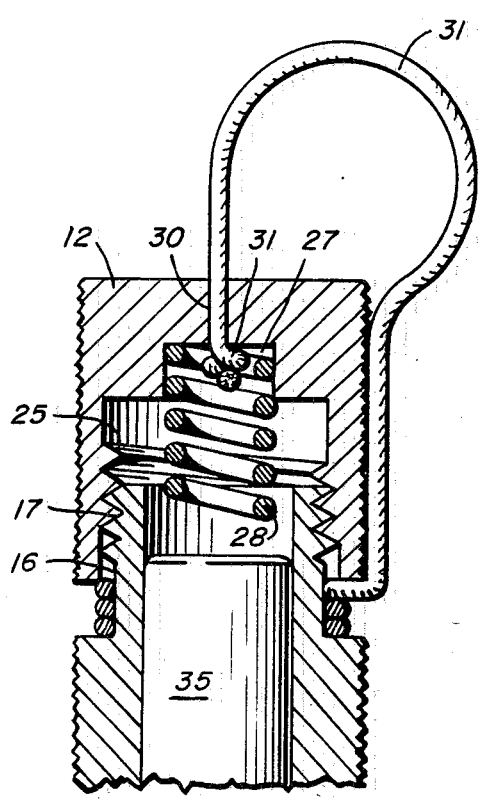
FIG. 3 is an enlarged section of the upper portion of FIG. 1 showing storage of the suspension string.

Cap 12 is also fashioned of metal and is internally threaded at 25 for engagement with barrel threads 17. The external surface of the cap is knurled as at 26. A cylindrical recess 27 is provided in cap 12 to receive a small coil spring 28. A small hole 30 is drilled through the cap end leading into recess 27. Plumb bob suspension line 31 has a retention knot 32 on one end to prevent its withdrawal from hole 30 and serves when in use to suspend the bob above the surface. When not in use, the line may be stored about the reduced diameter neck portion 16 after cap 12 has been unscrewed partially as shown in FIG. 3. A pair of AA size 1.5 volt batteries 35 or their equivalents are received in the barrel assembly 11 with the positive terminal 36 of the lower battery in contact with the terminal of bulb 19. The batteries are of course in series and the negative base of the uppermost battery is adapted to be contacted by spring 28 when in use.

Conical tip 14 has a bulb receiving recess 40 and several reduced diameter portions 41, 42 and 43 terminating in a chamfered opening 44. The emitted light beam 45 is colimated and provides a small pin-point light spot 46 on the surface.

Figure 2:
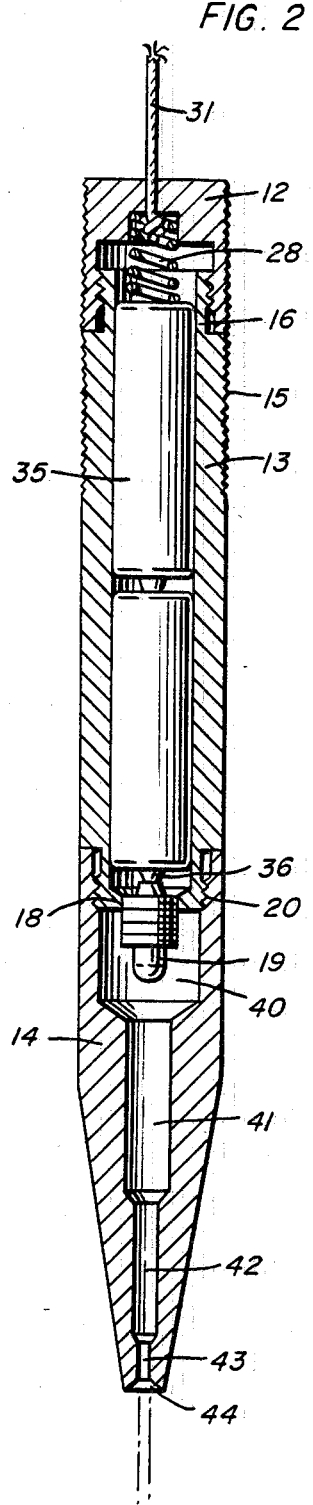
FIG. 2 is a vertical section of the plumb bob taken along line 2—2 of FIG. 1.

In use, the plumb bob is suspended in a conventional manner by line 31 from an overhead support, tripod, or the like, so that tip 44 is approximately ¾ to one inch above the surface. Cap 12 is then turned clockwise until it bottoms as in FIG. 2, at which point spring 28 being grounded to the inside of cap 12 forces batteries 35 against bulb 19 completing the electrical circuit illuminating the bulb for emission of light beam 45. To turn the light out, cap 12 is turned about ⅛ of a turn counterclockwise. To store the line 31 and to safeguard against use and battery consumption when not in use, cap 12 may be backed off as shown in FIG. 3. Three or four wraps of the line 31 may then be made about neck portion 16. This will block cap 12 from being tightened into actuating position.

If an emergency flashlight is needed, the conical tip 14 may be unscrewed and the cap turned to actuate bulb 19. In this case, the light will cover a wide area rather than the thin beam achieved by use of the conical tip.

It will be apparent that my new plumb bob may be used both in broad daylight as well as in darkened areas.

What I claim as my invention is:

1. A plumb bob assembly comprising a hollow elongated generally cylindrical body member, a tip mounted on one end of said body member and having a conical end portion and a passage extending longitudinally therethrough, a light bulb mounted in said assembly and adapted to emit light through said passage, battery means in said body member and in electrical contact with said light bulb, a cap member threadedly mounted on the other end of said body member and adapted when tightened against the body member to complete an electrical circuit between said battery means and said bulb to illuminate the bulb, and suspension line means attached to said cap member for suspending the plumb bob above a surface, said body member other end having a reduced-diameter end portion which is externally threaded adjacent to a top portion thereof for threaded reception thereover of said cap member, the remainder of the reduced-diameter end portion being unthreaded and serving as a storage means for said suspension line means, said storage means being accessible when said cap member is partially unscrewed from the body member to permit winding about said storage means of at least a portion of the suspension line means, and wherein the suspension line means stored within said storage means acts to prevent tightening of said cap member to prevent inadvertent actuation of the light bulb when said plumb bob assembly is not in use.

2. A plumb bob as defined in claim 1, wherein said tip is removable from said body member to permit use of the plumb bob as an emergency flashlight.

3. A plumb bob as defined in claim 1, wherein the passage extending through the tip consists of a plurality of decreasing diameter portions from an area adjacent said light bulb for narrowing said beam to provide a pin point spot of light on said surface.

4. A plumb bob as defined in claim 1 and further including spring means in said cap member for contact with said battery means when said cap is tightened.

5. A plumb bob as defined in claim 4 and including an aperture in said cap member, said suspension line means being secured within said cap member and passing through said aperture.

* * * * *